United States Patent
Lanzinger

(10) Patent No.: US 10,818,948 B2
(45) Date of Patent: Oct. 27, 2020

(54) EXPLOSION-PROTECTED FUEL CELL SYSTEM AND METHOD FOR DEACTIVATING A FUEL CELL SYSTEM

(71) Applicant: PROTON MOTOR FUEL CELL GMBH, Puchheim (DE)

(72) Inventor: Achim Lanzinger, Munich (DE)

(73) Assignee: PROTON MOTOR FUEL CELL GMBH, Puchheim (DE)

( * ) Notice: Subject to any disclaimer, the term of this patent is extended or adjusted under 35 U.S.C. 154(b) by 0 days.

(21) Appl. No.: 16/321,735

(22) PCT Filed: Jul. 27, 2017

(86) PCT No.: PCT/EP2017/069000
§ 371 (c)(1),
(2) Date: Feb. 26, 2019

(87) PCT Pub. No.: WO2018/019936
PCT Pub. Date: Feb. 1, 2018

(65) Prior Publication Data
US 2019/0245228 A1  Aug. 8, 2019

(30) Foreign Application Priority Data
Jul. 29, 2016  (DE) .......................... 10 2016 114 103

(51) Int. Cl.
*H01M 8/04955* (2016.01)
*H01M 8/04223* (2016.01)
(Continued)

(52) U.S. Cl.
CPC ... *H01M 8/04955* (2013.01); *H01M 8/04089* (2013.01); *H01M 8/04201* (2013.01);
(Continued)

(58) Field of Classification Search
CPC ......... H01M 8/04955; H01M 8/04089; H01M 8/04201; H01M 8/04753; H01M 8/04231
See application file for complete search history.

(56) References Cited

U.S. PATENT DOCUMENTS 10,439,239 B2 * 10/2019 Sinha ................ H01M 8/04664
2007/0154745 A1 * 7/2007 Penev ............... H01M 8/04798
429/413
(Continued)

FOREIGN PATENT DOCUMENTS

DE   102014016961   5/2016
DE   102014018121   6/2016
(Continued)

OTHER PUBLICATIONS

German Search Report issued in DE102016114103.8, dated May 24, 2017, 10 pages.
(Continued)

*Primary Examiner* — Stewart A Fraser
(74) *Attorney, Agent, or Firm* — ARC IP Law, PC; Joseph J. Mayo

(57) ABSTRACT

The invention relates to a fuel cell system having lines for feeding hydrogen from a high-pressure hydrogen reservoir into a fuel cell assembly. The lines have a high-pressure region, a medium-pressure region, and a fuel cell operating-pressure region. The lines of the medium-pressure region are pressure-relieved upon deactivation of the fuel cell system in order to avoid hydrogen diffusing out during standstill periods of the fuel cell system, and to thus avoid the formation of explosive hydrogen/air mixtures. The invention also relates to a tank module, which is configured for pressure relieving, to a method of deactivating and re-activating the fuel cell system, to the use of a 3/2-way valve for pressure-relieving the medium-pressure region of the hydrogen lines of a fuel cell system, and to a motor vehicle having a fuel cell system or tank module.

16 Claims, 2 Drawing Sheets

(51) Int. Cl.
- *H01M 8/04089* (2016.01)
- *H01M 8/04082* (2016.01)
- *H01M 8/04746* (2016.01)
- *H01M 8/1018* (2016.01)

(52) U.S. Cl.
CPC ... *H01M 8/04231* (2013.01); *H01M 8/04753* (2013.01); *H01M 2008/1095* (2013.01); *H01M 2250/20* (2013.01); *Y02E 60/321* (2013.01)

(56) References Cited

U.S. PATENT DOCUMENTS

| | | |
|---|---|---|
| 2010/0248054 A1 | 9/2010 | Umayahara et al. |
| 2011/0033763 A1* | 2/2011 | Adcock ............. H01M 8/04783 429/429 |
| 2013/0149620 A1 | 6/2013 | Fabian et al. |
| 2015/0267836 A1* | 9/2015 | Lee .................. F16K 17/32 251/129.07 |
| 2016/0159492 A1 | 6/2016 | Filangi et al. |

FOREIGN PATENT DOCUMENTS

| | | |
|---|---|---|
| DE | 112008003145 | 11/2016 |
| EP | 2538482 A2 | 12/2012 |

OTHER PUBLICATIONS

International Search Report and Written Opinion issued in PCT/EP2017/069000, dated Sep. 18, 2017, 3 pages.

International Preliminary Report on Patentability in PCT/EP2017/069000, dated Feb. 7, 2019, 9 pages.

* cited by examiner

EXPLOSION-PROTECTED FUEL CELL SYSTEM AND METHOD FOR DEACTIVATING A FUEL CELL SYSTEM

BACKGROUND OF THE INVENTION

Field of the Invention

The invention relates to a fuel cell system in which the formation of explosive gas mixtures is avoided during downtimes of the fuel cell system, and to a method of deactivating or shutting down a fuel cell system, which avoids the formation of explosive gas mixtures after deactivation, so that safe reactivation of the fuel cell system is possible.

Description of the Related Art

Fuel cells generate electrical energy from hydrogen and oxygen. Oxygen is usually supplied in the form of air, and hydrogen is supplied from a reservoir or generated locally, for example from methanol. The most common variant both for mobile and for stationary fuel cell systems is the hydrogen supply from high-pressure tanks. In the high-pressure tanks, hydrogen is stored under a pressure of up to 80 MPa (800 bar). One or more high-pressure tanks form a tank module. At the outlet of the tank module, the pressure is reduced by means of a pressure reducer to a manifold pressure level. In this medium-pressure region, the pressure is typically about 0.5-1.2 MPa (5-12 bar). By means of a further pressure reducer, the pressure is reduced to the operating pressure of the fuel cells. The operating pressure is usually higher than the respective ambient pressure and is typically up to 100 kPa (1 bar) above ambient pressure.

The fuel cells are grouped together into one or more fuel cell stacks and together with numerous peripheral elements, such as lines for supplying fresh operating gases and cooling water, for discharging and/or recirculating used operating gases and cooling water, treatment means for these operational utilities, sensors, valves, regulators, switches, heaters, etc., without which the operation of the fuel cells would not be possible, constitute a fuel cell module. Some of these components are provided with protective covers, housings or sheaths, and all components or at least most of the components are assembled as compactly as possible and accommodated together with the fuel cells in a housing. Although the housing is not necessarily gas-tight, the exchange of gas between the housing interior and the environment is at least severely restricted.

A supply line connects the tank module to the fuel cell module, that is to say to the fuel cells installed in a housing, and the required peripheral elements. The supply line between the tank module and the fuel cell module is usually subject to a pressure of 0.5-1.2 MPa (5-12 bar) hydrogen. In accordance with the particular arrangement of tank module and fuel cell module with respect to each other, the supply line may be of considerable length.

Gaseous hydrogen has a high diffusion tendency. Over longer periods of time, it also diffuses through materials that are generally considered as gas-tight materials. Hydrogen lines in fuel cell systems involve the additional problem that the hydrogen does not flow exclusively in welded pipelines, but that the hydrogen flow paths also have releasable connections such as threaded connections, for example, at the interfaces between tank module and supply line and between supply line and fuel cell module, as well as at all locations where sensors and actuators, such as valves or regulators, are integrated into the hydrogen lines. At these locations, the hydrogen leakage rate is particularly high, especially when the hydrogen is at a higher pressure than the surrounding atmosphere.

It must therefore always be expected that a certain amount of gaseous hydrogen leaks or diffuses from the lines of a fuel cell system into the surrounding atmosphere, i.e. the ambient air. This means a not insignificant hazard potential, because hydrogen together with air, more precisely with the oxygen contained in the air, forms ignitable mixtures (oxyhydrogen gas).

At room temperature, the reaction of hydrogen and oxygen takes place at an unmeasurable slow rate, since molecular hydrogen is relatively inert due to its high dissociation energy. However, if an elevated temperature is reached at a certain point, the reaction can be initiated at this point. The heat released thereby causes the molecules in the vicinity of the heated location to react, thereby generating further heat, etc. Starting from the heated location, a chain reaction with a strong increase in temperature then is effected explosively through the entire mixture of hydrogen and oxygen or air. However, an explosion will take place only when there is a specific mixing ratio of hydrogen and oxygen present, which is described by the upper and lower explosive limits.

Explosive limits are temperature and pressure dependent. In a mixture of hydrogen in air, an explosive mixture is present at a hydrogen concentration of about 4-75 volume % hydrogen (at room temperature and atmospheric pressure). Due to the compact design of fuel cell systems, the installation thereof in housings and confined spaces such as automobiles, thereby hindering the rapid escape of hydrogen, leakage of hydrogen from the lines can easily result in the lower explosive limit being exceeded. Already the electrics system of the fuel cell system itself then may cause the gas mixture to ignite, thus triggering an explosion.

To minimize this hazard, a number of safety precautions are taken in fuel cell systems of the prior art, primarily measures of primary and secondary explosion protection. Primary explosion protection is understood to involve measures that prevent the formation of explosive atmospheres or at least reduce the risk of their formation. Secondary explosion protection is understood to involve measures that prevent explosive atmospheres from being ignited, i.e. avoiding effective sources of ignition.

In tank modules, it is usually possible to accommodate the same in a well-ventilated outdoor area. As soon as hydrogen is no longer required for operation of the fuel cell system, it is possible to prevent the outflow of hydrogen by means of shut-off valves directly at the outlet of the hydrogen reservoirs.

The fuel cell module and its hydrogen supply line conventionally use a combination of primary and secondary explosion protection. During operation of the fuel cells, for example while driving a motor vehicle, the space in which the fuel cell module is installed and/or the entire vehicle interior is monitored by means of hydrogen sensors. If the presence of hydrogen is detected at any location, active ventilation is initiated immediately in order to remove the hydrogen.

This primary explosion protection fails when the system is shut down or deactivated. Many fuel cell systems are operated only for comparatively short periods of time while they are out of service for extended periods of time. Fuel cell powered motor vehicles, for example, are usually out of operation for a much longer period than in operation. During the inoperative periods, the hydrogen supply is normally shut off by means of a shut-off valve immediately downstream of the gas storage tank, but the hydrogen remaining in the lines between tank module and fuel cells can diffuse from the lines and may escape in particular through not completely tight connections between the lines and may accumulate in the enclosed areas of the fuel cell module and the hydrogen supply line. Depending on the length of the lines and the pressure prevailing in the lines, the respective amount of hydrogen may be considerable and, together with the ambient air, may lead to the formation of explosive mixtures. When the fuel cell system is activated or put into operation again, an explosion may be caused due to sparks that occur as a result of the activation of electrical components. Therefore, secondary explosion protection measures must be taken as well. For conventional fuel cell systems, this includes that the electrical circuits of the fuel cell module should be designed to be intrinsically safe, if possible. The intrinsically safe design is possible for measuring and control circuits and the electrical connection to sensors and actuators. Alternatively or additionally, potential ignition sources (sensors, electrically operated valves) are encapsulated, that is, explosion-protected components are used.

These measures are costly, result in a more complex structure and increased weight of the system, and moreover do not provide 100% explosion protection. Explosions that are triggered by system-external ignition sources cannot be prevented in this way.

BRIEF SUMMARY OF THE INVENTION

The object of the present invention therefore consists in providing a fuel cell system and methods of deactivating and reactivating a fuel cell system, in which the disadvantages of the prior art are eliminated or at least reduced. The system should be structurally simple and minimize the risk of a hydrogen explosion, especially when restarting the system after a longer downtime, but also during downtime itself. Preferably, it should be possible to completely or partly dispense with the use of expensive explosion-protected components.

The object is met by the fuel cell system having the features as set forth in independent claim 1, by the tank module having the features as set forth in independent claim 6, by the method of deactivating the inventive fuel cell system having the features as set forth in independent claim 11, by the method of reactivating the inventive fuel cell system having the features as set forth in independent claim 13, by the use of a 3/2-way relief valve for hydrogen pressure relief of hydrogen lines of the inventive fuel cell system having the features as set forth in independent claim 14, and by an electrical consumer or load, such as a motor vehicle, having the features as set forth in independent claim 16. Embodiments of the invention are set forth in the respective dependent claims.

The fuel cell system according to the invention consists essentially of two structural units, which in the following are referred to as tank module and fuel cell module. The tank module comprises one or more high-pressure containers (tanks) in which hydrogen is stored under a pressure of up to 80 MPa. Each tank preferably has a main shut-off valve and is connected to a hydrogen line through which hydrogen is supplied to the fuel cell module. In the hydrogen line, there is arranged a pressure reducer, and in case of several tanks, each tank may be provided with a separate pressure reducer of its own, or several tanks may have a common pressure reducer. The pressure reducer reduces the hydrogen pressure to a manifold pressure level of typically 0.3-3.0 MPa, preferably 0.5-1.2 MPa, before the hydrogen exits the tank module.

From the tank module, the hydrogen enters a hydrogen supply line which connects the tank module to the fuel cell module. The fuel cell module includes a fuel cell assembly, i.e. one or more fuel cell stacks. Also the means required for operating the fuel cell assembly, such as line or piping systems for supply and discharge of fresh and used fuel cell media, sensors, valves, regulators, water separators, pumps, reservoirs for cooling water, means for supplying cathode operating gas, etc., are deemed to constitute part of the fuel cell module.

The fuel cell module also comprises a pressure reducer that reduces the pressure of the hydrogen entering from the hydrogen supply into the hydrogen feed line of the fuel cell module line to the operating pressure of the fuel cell assembly. The operating pressure is generally slightly above ambient pressure and is preferably about 100-200 kPa.

Thus, the fuel cell system has three pressure regions, a high-pressure region upstream of the pressure reducer of the tank module, a medium-pressure region (0.3-3.0 MPa) between the pressure reducer of the tank module and the pressure reducer of the fuel cell module, and an operating-pressure region (100-200 kPa) downstream of the pressure reducer of the fuel cell module. The pressure in the high-pressure region is higher than in the medium-pressure region, typically higher than 30 MPa, and may be up to 80 MPa.

Preferably, the fuel cell module and the tank module are self-contained units that can be accommodated in spatially separated manner from each other. In a fuel cell powered motor vehicle, for example, it makes sense to accommodate the tank module in a location that is particularly easily accessible and at the same time well protected against damage from accidents, while the fuel cell module in principle may be accommodated at any location, depending on space availability. The length of the hydrogen supply line connecting the two modules is determined by the installation distance of the modules. Usually, each module and also the hydrogen supply line between the modules is equipped with a protective cover or installed in a housing. However, the modular design indicated above is by no means cogent. Rather, the components of the tank module and the components of the fuel cell module may be combined into a single unit. This integrated unit also has a high-pressure region, a medium-pressure region and an operating-pressure region with the respective pressures indicated above.

The hydrogen flowing in the lines has a high diffusion tendency, which is the higher the higher the hydrogen pressure. In particular, at all locations where lines are connected to each other, for example, by threaded engagement, and at all locations where sensors or actuators are integrated in the lines, hydrogen leaks occur particularly easily. As long as the hydrogen diffusion is not serious, this usually constitutes no danger in an operating fuel cell system, as the fuel cell system can be monitored by means of hydrogen sensors and appropriate measures, such as forced ventilation of the system, can be initiated immediately at an increased hydrogen concentration, which lower the hydrogen concentration in the area of the fuel cell system.

The situation is different with a deactivated fuel cell system. As long as the fuel cell system is out of operation, the safety devices are not active either, that is, leakage of hydrogen goes unnoticed and no measures are taken for rapid elimination thereof. If a fuel cell system is out of operation for a longer period of time, sufficient quantities of hydrogen can easily accumulate under covers and in housings or in poorly ventilated installation spaces, so that the lower explosive limit is exceeded. Particularly at risk here are all areas that are subject to a higher pressure than ambient pressure, in particular the medium-pressure region of the fuel cell system. The high-pressure region, i.e. the tank module is indeed also at risk, but has a relatively short piping system and mostly can also be arranged such that it is automatically well ventilated, for example, on the roof of a motor vehicle such as a bus.

If the fuel cell system is reactivated after a longer break, as occurs regularly, for example, when a motor vehicle is restarted after a longer parking time, sparks from electrical components of the fuel cell system such as sensors and electrically switched valves can cause the hydrogen/air mixture to explode. According to the invention, the formation of such explosive mixtures is avoided in that, when the fuel cell system is deactivated or immediately thereafter, the lines under elevated hydrogen pressure, i.e. the lines of the medium-pressure region or at least the majority of these lines, are pressure relieved. The diffusion tendency of hydrogen is lowest when the hydrogen pressure in the lines is substantially equal to or just above ambient pressure. To accomplish this pressure relief, a 3/2-way valve is provided in the fuel cell system according to the invention in the medium-pressure region, which permits to bring at least part of the medium-pressure region, and preferably the entire medium-pressure region, to ambient pressure or an only slightly higher pressure. The 3/2-way valve is located in the line leading from the hydrogen tank to the fuel cell assembly, with the third port being connected to a line opening outwardly into the atmosphere. In a first switching position of the 3/2-way valve, the flow path is open between the hydrogen tank and the fuel cell assembly, whereas in the second switching position of the 3/2-way valve, the flow path is open between the fuel cell assembly and the surrounding atmosphere. The 3/2-way valve preferably is a solenoid valve. The second switching position is the deenergized state, i.e. the switching position when the system is to be switched to a safe state.

During operation of the fuel cell system, the 3/2-way valve is in the first switching position. Upon deactivation of the fuel cell system, the main shut-off valve, if provided, and preferably also the shut-off valve in the fuel cell module are closed and immediately thereafter, i.e. with the least possible delay, the relief valve (3/2-way valve) is switched to the second switching position, so that the hydrogen present in the medium-pressure region can escape into the surrounding atmosphere. The closing of the valves and switching of the 3/2-way valve can be triggered by predetermined processes, such as switching off of the electrical load powered by the fuel cell system or detection of an emergency situation, such as exceeding the maximum permissible pressure of the fuel cell system.

The 3/2-way valve should be arranged as close as possible to the pressure reducer of the tank module, since only the part of the lines downstream of the 3/2-way valve can be pressure relieved. Therefore, the 3/2-way valve is preferably integrated into the tank module and arranged immediately downstream of the pressure reducer. Alternatively, however, the 3/2-way valve can also be mounted downstream of the tank module, preferably at the upstream end of the hydrogen supply line.

The 3/2-way valve should be designed such that it allows the hydrogen to escape only slowly. Too rapid escape could lead to the formation of an explosive hydrogen/air mixture at the outlet of the pressure relief line. Therefore, valves with a small opening cross-sectional area are preferred. The maximum speed with which the pressure relief may take place depends above all on the environment in which the pressure relief is carried out. If the fuel cell system is used in a location where rapid air exchange is reliably provided, the pressure relief can be effected within a few seconds, whereas in applications, such as in a motor vehicle, the pressure relief should be effected slowly, for example over several minutes. Motor vehicles are often parked in environments with low air change, such as garages. Which 3/2-way valve is suited best for a particular fuel cell system or a particular application, may optionally be determined by just a few experiments.

Alternatively, a throttle location may be provided in the pressure relief line whose opening cross-section is dimensioned such that always only so small amounts of hydrogen can escape that the lower explosive limit of hydrogen in air is not reached at the outlet of the pressure relief line. In that event, any valve suitable for hydrogen, that guarantees the required flow through the hydrogen supply line, can be used as 3/2-way valve. The installation is carried out in such a way that the second switching position is present in the currentless or deenergized state.

The 3/2-way valve can remain in its second switching position during the entire period of time in which the fuel cell system is deactivated. Alternatively, it can also be switched back to the first switching position after a predetermined period of time by means of a delay circuit. In particular when the valve remains in its second switching position, it is preferable to provide a check valve in the pressure relief line, which prevents the penetration of air and moisture into the piping system of the fuel cell system. The check valve should have a low opening pressure, preferably an opening pressure which is only slightly above the pressure of the surrounding atmosphere. For example, a suitable opening pressure is a pressure up to the operating-pressure region of the fuel cells, preferably up to 10 kPa (100 mbar).

When restarting or reactivating the fuel cell system, the main shut-off valve in the tank module (if provided) is opened first, thereafter the 3/2-way valve, if the latter is still in the second switching position, is switched to the first switching position, and then the shut-off valve in the fuel cell module is opened, if it was closed. The switching process can be triggered for example by switching on of the electrical load. Alternatively, it is of course also possible in principle to operate the 3/2-way valve and the other valves manually.

BRIEF DESCRIPTION OF THE DRAWINGS

In the following, the invention will be described in more detail with reference to drawings. It is to be understood that the drawings are not to scale and show only the features essential for understanding the present invention. It is understood that further features may be present or have to be present in order to comply with applicable safety regulations and to ensure proper functioning of the fuel cell system. However, these features are known to a person skilled in the art. In the drawings.

DETAILED DESCRIPTION OF THE INVENTION

Figure 1:
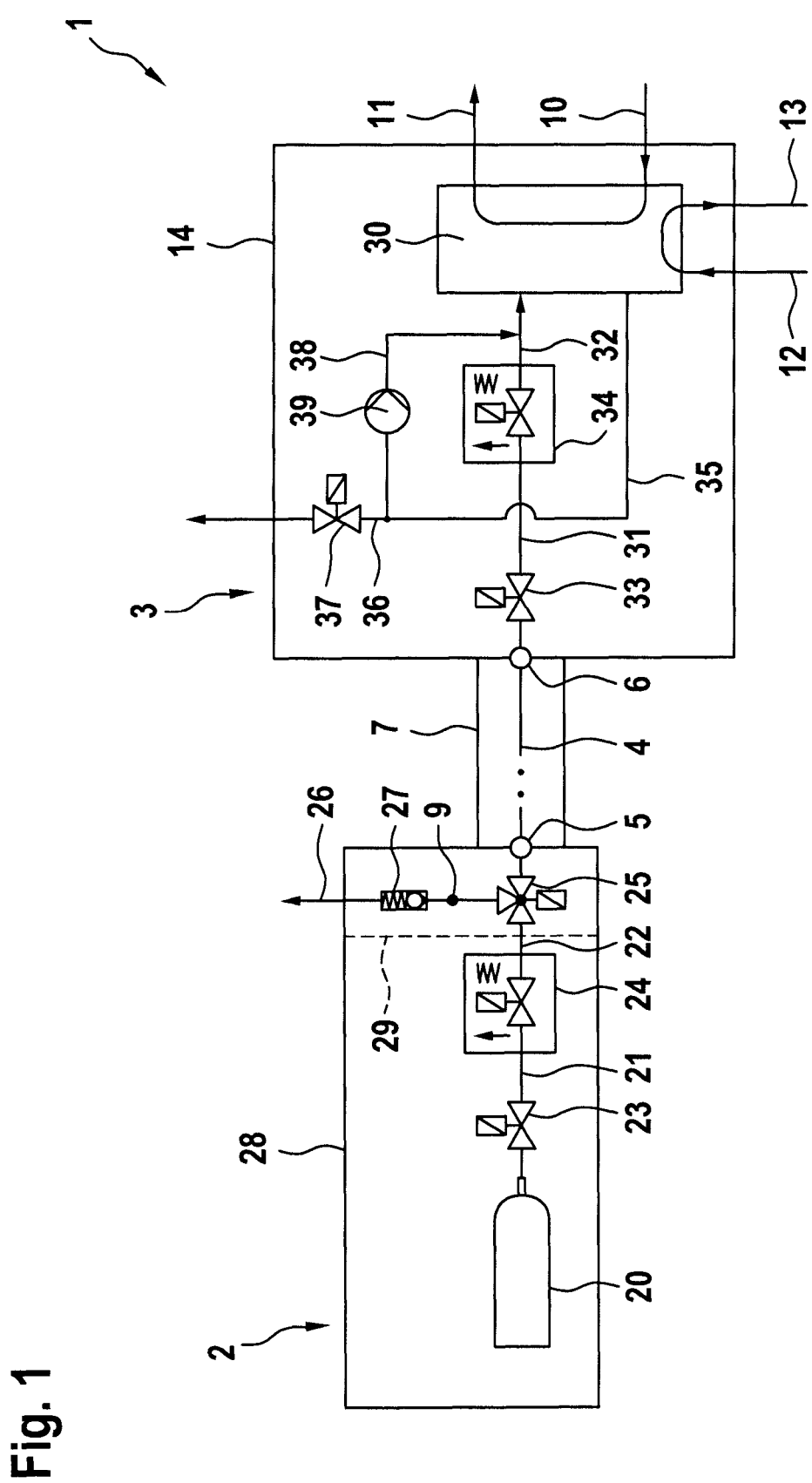
FIG. 1 shows a schematic, highly simplified representation of a fuel cell system according to the invention.

FIG. 1 schematically shows an embodiment of a fuel cell system 1 according to the invention. The fuel cell system 1 comprises a tank module 2 and a fuel cell module 3, wherein hydrogen can flow from the tank module 2 through a hydrogen supply line 4 into the fuel cell module 3.

In the embodiment illustrated, the tank module 2 comprises a high-pressure hydrogen reservoir (tank) 20, a main shut-off valve 23 for the tank 20 and a pressure reducer 24. Through a hydrogen line 21, hydrogen can flow from the tank 20 to the pressure reducer 24. Here, the hydrogen pressure is reduced to a pressure of preferably 0.5 MPa to 1.2 MPa and fed from there through a hydrogen line 22. The hydrogen flows through the 3/2-way valve 25 and enters the hydrogen supply line 4 which at the connection point 5 is connected to the hydrogen line 22. The length of the hydrogen supply line 4 is dependent on the distance between the tank module 2 and the fuel cell module 3, which is indicated by the dotted line. At the connection point 6, the hydrogen supply line 4 is connected to the fuel cell module 3. From here hydrogen flows through a hydrogen feed line 31, in which a check valve 33 is located, to a pressure reducer 34 which reduces the hydrogen pressure to the operating pressure of the fuel cells in the fuel cell assembly 30. From the pressure reducer 34, the hydrogen finally flows through the hydrogen feed line 32 into the fuel cell assembly 30.

Anode exhaust gas leaves the fuel cell assembly 30 through an anode exhaust gas line 35 and is recirculated into the hydrogen feed line 32 through an anode exhaust gas recirculation line 38 by means of an anode exhaust gas recirculation pump 39. Periodically, part of the anode exhaust gas is discharged through an anode exhaust gas discharge line 36 into the surrounding atmosphere. Normally, the line 36 is closed by means of the shut-off valve 37.

Cathode operating gas enters the fuel cell assembly 30 through an air supply line 10 and exits the same through a cathode exhaust gas line 11. Cooling water enters the fuel cell assembly 30 through a cooling water supply pipe 12 and exits through a cooling water discharge line 13.

In the embodiment illustrated, the tank module 2 is arranged in a housing 28, and the fuel cell module 3 is installed in a housing 14. A cover 7 protects the hydrogen supply line 4.

During operation of the fuel cell system 1, the valves 23 and 33 are opened, and the 3/2-way valve 25 is in the first switching position thereof, which allows a flow of hydrogen from the tank 20 into the fuel cell assembly 30. Hydrogen sensors (not illustrated) in the interior of the housings 4, 14 monitor whether hydrogen is diffusing or leaking from the piping system. If the presence of hydrogen is detected, forced ventilation is immediately initiated, for example by means of suitable blowers (not illustrated).

Upon deactivation of the fuel cell system 1, safety systems such as hydrogen detectors and blowers providing rapid air exchange are off. In order to nevertheless ensure the safety of the fuel cell system 1 in this case, the present invention provides for closing of valves 23 and 33, followed by switching the 3/2-way valve 25 to its second switching position, i.e. to the deenergized state. In the second switching position, the flow path through the hydrogen line 22 is blocked and instead the flow path from the hydrogen supply line 4 into a hydrogen pressure relief line 26 is opened. The system is also switched into this "safe state" if for any reason an emergency shutdown must be performed, for example, if sensors detect an excessively high pressure or an excessively high temperature in any area of the fuel cell assembly or the line system. The hydrogen pressure relief line 26 has a check valve 27 arranged therein, which opens at an opening pressure which is at most equal to or below the operating pressure of the fuel cell assembly 30, preferably at less than 10 mbar above atmospheric pressure. In this way, hydrogen present in the medium-pressure region between the 3/2-way valve 25 and the shut-off valve 33, or between the 3/2-way valve 25 and the pressure reducer 34 (with open shut-off valve 33), is discharged into the surrounding atmosphere until the hydrogen pressure in this range falls below the opening pressure of the check valve 27. A throttle location 9 ensures that the hydrogen escapes slowly. Alternatively, this can also be achieved by a correspondingly small opening cross-section of the 3/2-way valve 25.

As can be seen from FIG. 1, the line 22 between the pressure reducer 24 and the 3/2-way valve 25 is not pressure relieved or depressurized. Therefore, it is useful to integrate the 3/2-way valve 25 into the tank module 2 and install the same immediately downstream of the pressure reducer 24. Alternatively, however, it is also possible to provide the 3/2-way valve 25 outside the tank module 2, i.e. in the hydrogen supply line 4. This embodiment is illustrated by the housing 29 of the tank module 2, which is shown in broken lines.

Upon renewed activation of the fuel cell system 1, the valve 23 is opened and the 3/2-way valve 25 is switched back to the first switching position. Thereafter, the valve 33 is opened if it was closed. The switching of the valves can be effected manually or automatically. Preferably, solenoid valves are used.

Figure 2:
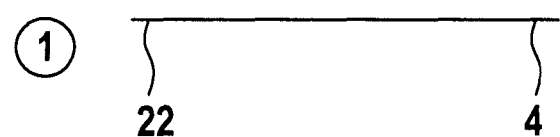
FIG. 2 shows switching positions of the 3/2-way valve used according to the invention.
Figure 2:
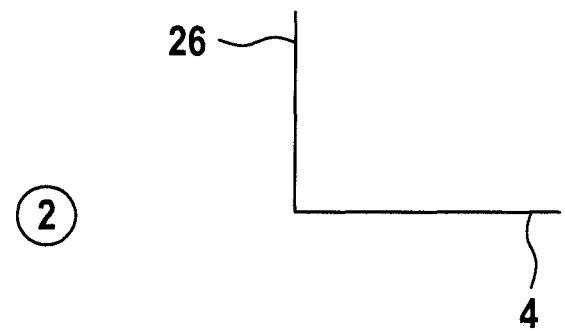

FIG. 2 shows the switching positions of the 3/2-way valve 25. The first switching position allows a hydrogen flow from the hydrogen line 22 into the hydrogen supply line 4, and the second switching position allows a hydrogen flow from the hydrogen supply line 4 into the hydrogen pressure relief line 26, and from there in the surrounding atmosphere. The second switching position is the deenergized or currentless ("safe") state of the solenoid valve 25. The opening cross-section of the 3/2-way valve 25 is to be chosen such that, in the first switching position, sufficient hydrogen can always flow to the fuel cell assembly 30, and in the second switching position, there can always escape only so much hydrogen into the surrounding atmosphere that the formation of an ignitable hydrogen/air mixture is avoided by the natural air change. In the case of a larger opening cross-section, a throttle location 9 with a correspondingly small opening cross-section may be provided downstream of the 3/2-way valve 25 in the hydrogen pressure relief line 26.

What is claimed is:

1. A fuel cell system, comprising:
    a fuel cell assembly,
    a hydrogen feed line for feeding hydrogen to the fuel cell assembly,
    a pressure reducer in the hydrogen feed line,
    a high-pressure hydrogen reservoir,
    a hydrogen line for feeding hydrogen from the high-pressure hydrogen reservoir into a hydrogen supply line for the fuel cell assembly, which connects the hydrogen line and the hydrogen feed line with each other,
    a pressure reducer in the hydrogen line for reducing the hydrogen pressure,
    a 3/2-way valve in the hydrogen line downstream of the pressure reducer or in the hydrogen supply line, and
    a hydrogen pressure relief line connected to the 3/2-way valve,
    wherein the 3/2-way valve, in a first switching position, allows a flow of gas from the high-pressure hydrogen reservoir into the hydrogen supply line, and in a second switching position, allows the flow of gas from the hydrogen supply line into the hydrogen pressure relief line.

2. The fuel cell system of claim 1, wherein the fuel cell system comprises a shut-off valve in the hydrogen feed line upstream of the pressure reducer and/or the high-pressure hydrogen reservoir comprises a main shut-off valve.

3. The fuel cell system of claim 1, further comprising a check valve having an opening pressure of less than 10 kPa (100 mbar) in the hydrogen pressure relief line.

4. The fuel cell system of claim 1, wherein the fuel cell system is designed such that, at least one of
by disconnection of an electrical load from the fuel cell system or by detection of an emergency situation, switching of the 3/2-way valve from the first switching position to the second switching position is triggered,
by activation of the fuel cell assembly, switching of the 3/2-way valve from the second switching position to the first switching position is triggered.

5. The fuel cell system of claim 1, wherein switching of the 3/2-way valve from the first switching position to the second switching position causes hydrogen to be released into surrounding atmosphere.

6. A tank module for supplying a fuel cell assembly with hydrogen, comprising:
a high-pressure hydrogen reservoir,
a hydrogen line for feeding hydrogen from the high-pressure reservoir into a hydrogen supply line for the fuel cell assembly,
a pressure reducer in the hydrogen line for reducing the hydrogen pressure,
a 3/2-way valve in the hydrogen line downstream of the pressure reducer, and
a hydrogen pressure relief line connected to the 3/2-way valve,
wherein the 3/2-way valve, in a first switching position, permits a flow of gas from the high-pressure hydrogen reservoir into the hydrogen supply line, and in a second switching position, permits the flow of gas from the hydrogen supply line into the hydrogen pressure relief line.

7. The tank module of claim 6, wherein the high-pressure hydrogen reservoir comprises a main shut-off valve.

8. The tank module of claim 6, wherein the tank module is designed such that, upon deactivation of the fuel cell assembly or upon detection of an emergency situation, the 3/2-way valve is automatically switched to the second switching position thereof and/or is automatically switched to the first switching position thereof when the fuel cell assembly is put into operation.

9. The tank module of claim 6, further comprising a check valve having an opening pressure of less than 10 kPa (100 mbar) in the hydrogen pressure relief line.

10. The tank module of claim 6, wherein switching of the 3/2-way valve from the first switching position to the second switching position causes hydrogen to be released into surrounding atmosphere.

11. A method of deactivating a fuel cell system comprising:
providing a fuel cell system comprising
a fuel cell assembly,
a hydrogen feed line for feeding hydrogen to the fuel cell assembly,
a pressure reducer in the hydrogen feed line,
a high-pressure hydrogen reservoir,
a hydrogen line for feeding hydrogen from the high-pressure hydrogen reservoir into a hydrogen supply line for the fuel cell assembly, which connects the hydrogen line and the hydrogen feed line with each other,
a pressure reducer in the hydrogen line for reducing the hydrogen pressure,
a 3/2-way valve in the hydrogen line downstream of the pressure reducer or in the hydrogen supply line, and
a hydrogen pressure relief line connected to the 3/2-way valve,
wherein the 3/2-way valve, in a first switching position, allows a flow of gas from the high-pressure hydrogen reservoir into the hydrogen supply line, and in a second switching position, allows the flow of gas from the hydrogen supply line into the hydrogen pressure relief line;
characterized in that feeding of hydrogen from the hydrogen line into the hydrogen supply line is terminated and immediately thereafter the 3/2-way valve is switched from the first switching position to the second switching position.

12. The method of claim 11, characterized in that the termination of feeding hydrogen into the hydrogen supply line and the switching of the 3/2-way valve from the first switching position to the second switching position is triggered by disconnection of an electrical load from the fuel cell system or by detection of an emergency situation.

13. A method of activating and deactivating a fuel cell system comprising:
providing a fuel cell system comprising
a fuel cell assembly,
a hydrogen feed line for feeding hydrogen to the fuel cell assembly,
a pressure reducer in the hydrogen feed line,
a high-pressure hydrogen reservoir,
a hydrogen line for feeding hydrogen from the high-pressure hydrogen reservoir into a hydrogen supply line for the fuel cell assembly, which connects the hydrogen line and the hydrogen feed line with each other,
a pressure reducer in the hydrogen line for reducing the hydrogen pressure,
a 3/2-way valve in the hydrogen line downstream of the pressure reducer or in the hydrogen supply line, and
a hydrogen pressure relief line connected to the 3/2-way valve,
wherein the 3/2-way valve, in a first switching position, allows a flow of gas from the high-pressure hydrogen reservoir into the hydrogen supply line, and in a second switching position, allows the flow of gas from the hydrogen supply line into the hydrogen pressure relief line;
characterized in that, upon deactivating the fuel cell system, feeding of hydrogen from the hydrogen line into the hydrogen supply line is terminated and immediately thereafter the 3/2-way valve is switched from the first switching position to the second switching position; and,
characterized in that, upon activating the fuel cell system, hydrogen is provided for being fed from the hydrogen line into the hydrogen supply line, and thereafter the 3/2-way valve is switched from the second switching position to the first switching position.

14. A method of pressure-relieving the hydrogen supply line and, optionally, part of the hydrogen feed line of a fuel cell system, comprising:

providing a fuel cell system comprising
- a fuel cell assembly,
- a hydrogen feed line for feeding hydrogen to the fuel cell assembly,
- a pressure reducer in the hydrogen feed line,
- a high-pressure hydrogen reservoir,
- a hydrogen line for feeding hydrogen from the high-pressure hydrogen reservoir into a hydrogen supply line for the fuel cell assembly, which connects the hydrogen line and the hydrogen feed line with each other,
- a pressure reducer in the hydrogen line for reducing the hydrogen pressure,
- a 3/2-way valve in the hydrogen line downstream of the pressure reducer or in the hydrogen supply line, and
- a hydrogen pressure relief line connected to the 3/2-way valve,
- wherein the 3/2-way valve, in a first switching position, allows the flow of gas from the high-pressure hydrogen reservoir into the hydrogen supply line, and in a second switching position, allows the flow of gas from the hydrogen supply line into the hydrogen pressure relief line;

wherein switching of the 3/2-way valve from the first switching position to the second switching position causes hydrogen to be released from the hydrogen supply line into surrounding atmosphere and, optionally, from said part of the hydrogen feed line into the surrounding atmosphere.

15. A motor vehicle comprising:
a fuel cell system comprising
- a fuel cell assembly,
- a hydrogen feed line for feeding hydrogen to the fuel cell assembly,
- a pressure reducer in the hydrogen feed line,
- a high-pressure hydrogen reservoir,
- a hydrogen line for feeding hydrogen from the high-pressure hydrogen reservoir into a hydrogen supply line for the fuel cell assembly, which connects the hydrogen line and the hydrogen feed line with each other,
- a pressure reducer in the hydrogen line for reducing the hydrogen pressure,
- a 3/2-way valve in the hydrogen line downstream of the pressure reducer or in the hydrogen supply line, and
- a hydrogen pressure relief line connected to the 3/2-way valve,
- wherein the 3/2-way valve, in a first switching position, allows a flow of gas from the high-pressure hydrogen reservoir into the hydrogen supply line, and in a second switching position, allows the flow of gas from the hydrogen supply line into the hydrogen pressure relief line; or
a tank module that supplies the fuel cell assembly with hydrogen, the tank module comprising
- a high-pressure hydrogen reservoir,
- a hydrogen line for feeding hydrogen from the high-pressure hydrogen reservoir into a hydrogen supply line for the fuel cell assembly,
- a pressure reducer in the hydrogen line for reducing the hydrogen pressure,
- a 3/2-way valve in the hydrogen line downstream of the pressure reducer, and
- a hydrogen pressure relief line connected to the 3/2-way valve,
- wherein the 3/2-way valve, in a first switching position, permits the flow of gas from the high-pressure hydrogen reservoir into the hydrogen supply line, and in a second switching position, permits the flow of gas from the hydrogen supply line into the hydrogen pressure relief line.

16. The motor vehicle of claim 15, wherein switching of the 3/2-way valve from the first switching position to the second switching position causes hydrogen to be released into surrounding atmosphere.

* * * * *